United States Patent
Berestov et al.

(10) Patent No.: US 8,542,320 B2
(45) Date of Patent: Sep. 24, 2013

(54) METHOD AND SYSTEM TO CONTROL A NON-GESTURE CONTROLLED DEVICE USING GESTURE INTERACTIONS WITH A GESTURE CONTROLLED DEVICE

(75) Inventors: Alexander Berestov, San Jose, CA (US); Hans Masli, Milpitas, CA (US)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/817,528

(22) Filed: Jun. 17, 2010

(65) Prior Publication Data
US 2011/0310298 A1    Dec. 22, 2011

(51) Int. Cl.
*H04N 7/00* (2011.01)
*H04N 11/00* (2006.01)
*G06F 3/033* (2013.01)

(52) U.S. Cl.
USPC ........... 348/552; 348/734; 348/553; 715/863; 345/156

(58) Field of Classification Search
USPC ......... 348/563, 734, 552, 553; 345/156–158; 715/863
See application file for complete search history.

(56) References Cited

U.S. PATENT DOCUMENTS

| | | | |
|---|---|---|---|
| 5,594,469 A | 1/1997 | Freeman et al. | |
| 7,218,243 B2 * | 5/2007 | Hayes et al. | 340/12.25 |
| 8,428,368 B2 * | 4/2013 | Ivanich et al. | 382/209 |
| 2005/0132420 A1 | 6/2005 | Howard et al. | |
| 2008/0246734 A1 | 10/2008 | Tsui et al. | |
| 2009/0079813 A1 * | 3/2009 | Hildreth | 348/14.03 |
| 2009/0102800 A1 * | 4/2009 | Keenan | 345/173 |
| 2009/0239587 A1 * | 9/2009 | Negron et al. | 455/566 |
| 2011/0181524 A1 * | 7/2011 | Hinckley et al. | 345/173 |

FOREIGN PATENT DOCUMENTS

WO 2009053970 4/2009

OTHER PUBLICATIONS

Control Your TV With Hand Gestures, Hands in the News. http://www.handresearch.com/news/hand-gestures-control-your-tv.htm. Feb. 4, 2008.
Wave Your Hands to Control Your TV, Technology Trends. http://www.primidi.com/Wave_your_hands_to_control_your_TV; Jul. 17, 2007.

* cited by examiner

*Primary Examiner* — Michael Lee
(74) *Attorney, Agent, or Firm* — John L. Rogitz

(57) ABSTRACT

A television set. The television set includes a display, a gesture detector, a transceiver, a processor, and a memory component. The display is operable to render images. The gesture detector is operable to detect gesture interactions, e.g., initiation of gesture control operation. The transceiver is operable to communicate with an electronic device that is separate from the television set. The processor is operable to cause the transceiver to send a request message to the electronic device. The request message is a request to receive a graphical user interface (GUI) of the electronic device for rendering on the display. The transceiver receives the GUI of the electronic device responsive to the request message. The processor generates a command message responsive to gesture interaction with the GUI of the electronic device. The command message is operable to control an operation of the electronic device and is transmitted to the electronic device.

18 Claims, 6 Drawing Sheets

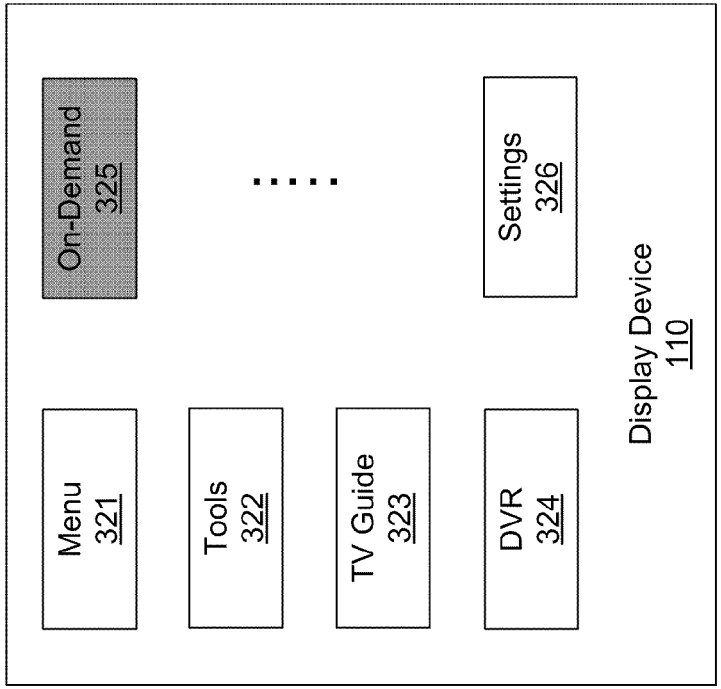
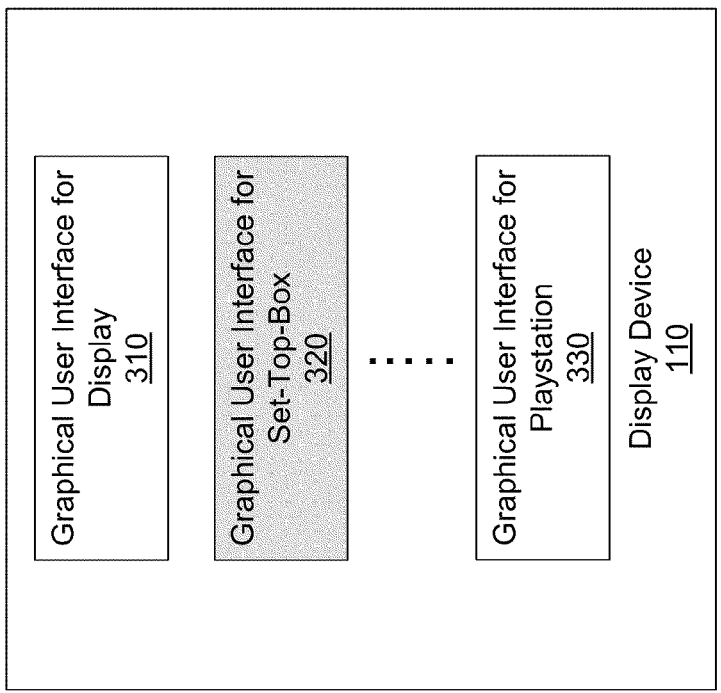

METHOD AND SYSTEM TO CONTROL A NON-GESTURE CONTROLLED DEVICE USING GESTURE INTERACTIONS WITH A GESTURE CONTROLLED DEVICE

TECHNICAL FIELD

Embodiments of the present invention relate to the field of electronics. More particularly, embodiments of the present invention relate to gesture control of electronic devices.

BACKGROUND ART

In recent years, the number of electronic devices that are controlled by a remote control or other similar means has increased. Unfortunately, a remote control for controlling the device may be easily misplaced. As a result, a user is required to either manually manipulate the electronic device or alternatively search for the remote control, both of which are inconvenient to the user.

Additionally, each device having a separate remote control increases clutter. In recent years, universal remote controls have been developed and used to reduce clutter by reducing the number of remote controls. However, a universal remote control still fails to provide a full functionality for all electronic devices. Additionally remote controls need to be located and handled before they can be used to control the device.

Gesture control has been developed to control the operation of an electronic device while eliminating the use of a remote control or at least complementing the use of the remote control. For example, some television sets are now capable of being controlled using hand gestures in a similar fashion as they can be controlled using a remote control. Gesture controlled devices provide a user with many of the functionalities that a remote control provides, e.g., navigating menus, digital photo albums, changing channels, controlling volume, changing brightness, etc.

Unfortunately, implementation of gesture control for multiple devices is complicated. Moreover, controlling multiple devices using gesture control requires a camera and gesture software to be integrated within each of the multiple devices, thereby increasing cost and complexity for the individual device.

Furthermore, gesture control requires a line of site with the camera of the gesture controlled device, which can be problematic for some devices that may be hidden from view.

SUMMARY

Accordingly, a need has arisen to enable a non-gesture controlled device to become gesture controlled without integrating a camera or gesture software within the non-gesture controlled device. Moreover, a need has arisen to gesture control a non-gesture controlled device in absence of a clear line of site with the non-gesture controlled device. Furthermore, a need has arisen to control a non-gesture controlled device using gesture interactions captured by a separate gesture controlled device. It will become apparent to those skilled in the art in view of the detailed description of the present invention that the embodiments of the present invention remedy the above mentioned needs and provide the above referenced advantages.

According to one embodiment, gesture interactions with a gesture controlled device, e.g., a television set, may be used to control a non-gesture controlled device, e.g., a set-top-box. In one exemplary embodiment, once a gesture control operation of the gesture controlled device is initiated, a request message is sent, e.g., using radio frequency (RF), high definition multimedia interface (HDMI) consumer electronic control (CEO), etc., to the non-gesture controlled device. The request message may be a request for a graphical user interface (GUI) or a file type in extensible markup language format (XML), of the non-gesture controlled device. The non-gesture controlled device transmits or otherwise involves the GUI to the gesture controlled device for rendering.

The gesture controlled device may render the received GUI of the non-gesture controlled device for user interaction thereof. The user interaction with the GUI may result in the selection and generation of a command message, e.g., message ID, HDMI CEO command, message block/frame, execution of action/script, etc., by the gesture controlled device. The command message is subsequently transmitted to the non-gesture controlled device, e.g., by wireless or wire line communication. As such, the non-gesture controlled device performs an operation based on the command message, thereby controlled by gesture interactions received by the gesture controlled device. It is appreciated that the non-gesture controlled device may transmit a response signal, e.g., resulting data, to the gesture controlled device responsive to performing the operation based on the command message. The wireless communication can be among RF wireless infrared wireless, Wi-Fi, etc. It is appreciated that the wire line communication may be via an HDMI cable, Ethernet cable, broadband over powerline (BPL), etc.

Accordingly, a non-gesture controlled device may now be controlled using gesture interactions with respect to a gesture controlled device. Moreover, the non-gesture controlled device becomes gesture controlled enabled without integrating a camera or gesture software within the non-gesture controlled device, thereby minimizing cost and complexity of the device. Furthermore, the non-gesture controlled device becomes gesture control enabled even in absence of a clear line of site with the non-gesture controlled device or the user.

More particularly, a television set that is gesture controlled may be used to enable a non-gesture controlled device, e.g., a set-top-box, to become gesture controlled. The television set in one embodiment includes a display, a gesture detector, a transceiver, and a processor. It is appreciated that a television is exemplary and not intended to limit the scope of the present invention. For example, a game console or any other electronic device may be used.

The display is operable to render images. The gesture detector is operable to detect an initiation of a gesture control operation. The gesture detector may include a camera for accepting gesture interaction with a graphical user interface (GUI) being rendered by the television set. The GUI may be specific for the non-gesture controlled device, e.g., the set-top-box. It is appreciated that the gesture detector may further include gesture recognition logic operable to process gesture interactions. It is further appreciated that in one embodiment, the gesture recognition logic may be integrated within the processor.

The transceiver is operable to communicate with a non-gesture controlled electronic device, e.g., set-top-box separate from the television set. The processor is operable to cause the transceiver to send a request message to the non-gesture controlled electronic device. The request message is a request for a GUI of the non-gesture controlled electronic device. The transceiver receives or otherwise involves the GUI of the non-gesture controlled electronic device responsive to the request message. In one embodiment, the television set may include a memory component operable to store the GUI of the non-gesture controlled electronic device.

It is appreciated that the processor may cause the display to render the GUI of the non-gesture controlled electronic device for user interaction thereof, e.g., the gesture detector may receive and process gesture interactions with the GUI of the non-gesture controlled electronic device. The processor may generate a command message responsive to gesture interactions with the GUI of the non-gesture controlled electronic device. The command message may be command for the non-gesture controlled electronic device to perform a certain operation, e.g., record a program. According to one embodiment, the command message is operable to control an operation of the non-gesture controlled electronic device. In one example, the processor causes the transceiver to send the command message to the non-gesture controlled electronic device for performing an operation, e.g., via an RF wireless path, Wi-Fi, or HDMI cable, for instance. Thus, the non-gesture controlled electronic device can be controlled based on gesture interactions with the GUI rendered by the television set. It is appreciated that the transceiver is operable to receive a response message from the non-gesture controlled electronic device responsive to the command message being sent, e.g., when the command message is received and an operation is performed by the non-gesture controlled electronic device. It is appreciated that the transceiver may include a radio frequency component to enable communication between the television set and the non-gesture controlled electronic device even in absence of a clear line of sight between the devices or between the user and the non-gesture controlled electronic device.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 3A-3C show exemplary graphical user interface (GUI) on-screen displays of a non-gesture controlled device rendered by a gesture controlled device for interaction thereof in accordance with one embodiment of the present invention.

DETAILED DESCRIPTION

Figure 1:
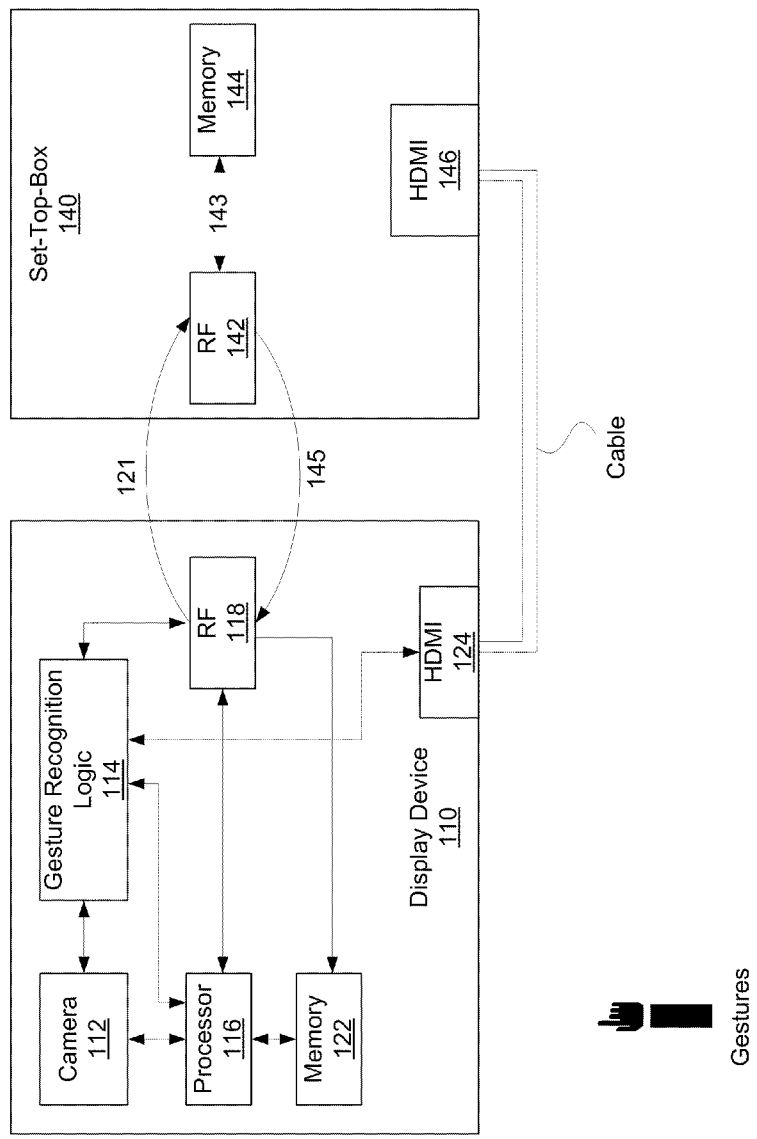
FIG. 1 shows a system for controlling a non-gesture controlled device using gesture interactions with a gesture controlled device in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, television set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, packets, messages, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "altering" or "clearing" or "accessing" or "detecting" or "obtaining" or "selecting" or "calculating" or "measuring" or "querying" or "receiving" or "sending" or "providing" or "storing" or "displaying" or "rendering" or "generating" or "prompting" or "changing" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System to Control a Non-Gesture Controlled Device Using Gesture Interactions with a Gesture Controlled Device Referring now to FIG. 1, an exemplary system 100 for controlling a non-gesture controlled device 140 using gesture interactions with a gesture controlled device 110 in accordance with one embodiment of the present invention is shown. In one embodiment, the gesture controlled device 110 may be a display device, e.g., a television set, a set-top-box, a gaming machine, a mobile device, a computer, a cell phone, etc. The non-gesture controlled device 140 may be any electronic device, e.g., a set-top-box (STB), a receiver, a video source, a computer, an appliance, another display device, a television set, a recorder, etc.

Gesture controlled devices are capable of being controlled using gestures, e.g., hand gestures, without a need to use a remote control or other means. Gesture controlled devices provide a user with similar functionalities that a remote control provides, e.g., navigating menu items, changing channels, controlling volume, changing brightness, etc. On the other hand, non-gesture controlled devices cannot be controlled using gestures. For example, a remote control must be used to control a non-gesture controlled STB. According to one exemplary embodiment, gesture interactions with the gesture controlled device, e.g., display device 110, may be used to control the operation of the non-gesture controlled device, e.g., STB 140.

According to one embodiment, the display device 110 includes a camera 112, gesture recognition logic 114, a processor 116, a wireless component, e.g., a radio frequency (RF) component 118, and a memory component 122. The memory component 122 may store instructions for execution by the processor 116 and/or the gesture recognition logic 114. It is appreciated that in one embodiment, the gesture recognition logic 114 may be integrated within the processor 116 or may be firmware or software. The STB 140 may include an RF component 142 and a memory component 144. It is appreciated that the STB 140 may also include a processor (not shown).

In one exemplary embodiment, the camera 112 captures gestures by a user. The captured gestures may be processed by the gesture recognition logic 114. For example, the sign to invoke gesture interaction operation may be to wave a "V" shaped hand in the air. The camera 112 captures a user waving a "V" shaped hand in the air and the gesture recognition logic 114 processes the captured information by the camera 112. As a result, the gesture recognition logic 114 may determine that a gesture interaction operation is invoked. The result of the processing may be communicated to the processor 116.

If recognized as such, the processor 116 may generate a request message for other electronic devices. For example, the request message may be a request to obtain or otherwise involve a graphical user interface (GUI) of the STB 140. The request message may be stored in the memory component 122. In one embodiment, the processor 116 causes the RF component 118 to transmit the request message 121 to the STB 140 for display. It is appreciated that the use of the RF 118 component is exemplary and it is not intended to limit the scope of the present invention. For example, other wireless technology or a wired transmission line may be used to communicate between the display device 110 and the STB 140.

The STB 140 may receive the request message using its RF 142 component. As a result, the processor of the STB 140 may cause the GUI of the STB 140 to be fetched from the memory component 144 and subsequently transmitted to or otherwise involved on device 110. The RF 142 component may transmit 145 the GUI of the STB 140 to the display device 110. It is appreciated that the use of the RF 142 component is exemplary and not intended to limit the scope of the present invention. For example, a wired transmission line or cable may be used to facilitate communication of the GUI between the STB 140 and the display device 110. In one exemplary embodiment, an HDMI component 124 of the display device 110 communicates with an HDMI component 146 of the STB 140 via the cable which may be an HDMI cable. It is appreciated that other forms of communication may be utilized, e.g., communication via Ethernet, broadband over power line (BPL), etc. As such, the specific embodiments mentioned are exemplary and not intended to limit the scope of the present invention.

The display device 110 receives or otherwise involves the GUI of the STB 140. It is appreciated that the GUI may be in any format, e.g., XML/HTML, On-Screen-Display (OSD) of bitmaps, windows, graphics, etc. Accordingly to one embodiment, the GUI may be stored in the memory component 122. In one exemplary embodiment, the processor 116 may cause the GUI of the STB 140 to be rendered along with the GUI of the display device 110. As a result, a user may interact directly with the GUI of the STB 140 using gestures. For example, the camera 112 may capture gesture interactions with the GUI of the STB 140. The captured gesture interactions are processed by the gesture recognition logic 114 and an appropriate command, message, data, action, based on the gesture interactions with the GUI of the STB 140 may be generated or executed. The generated command is operable to control an operation of the STB 140 when transmitted and executed by the STB 140. Gesture interactions with the GUI of the STB 140 rendered by the display device 110 are described in more detail with respect to FIGS. 3A-3C.

Figure 2:
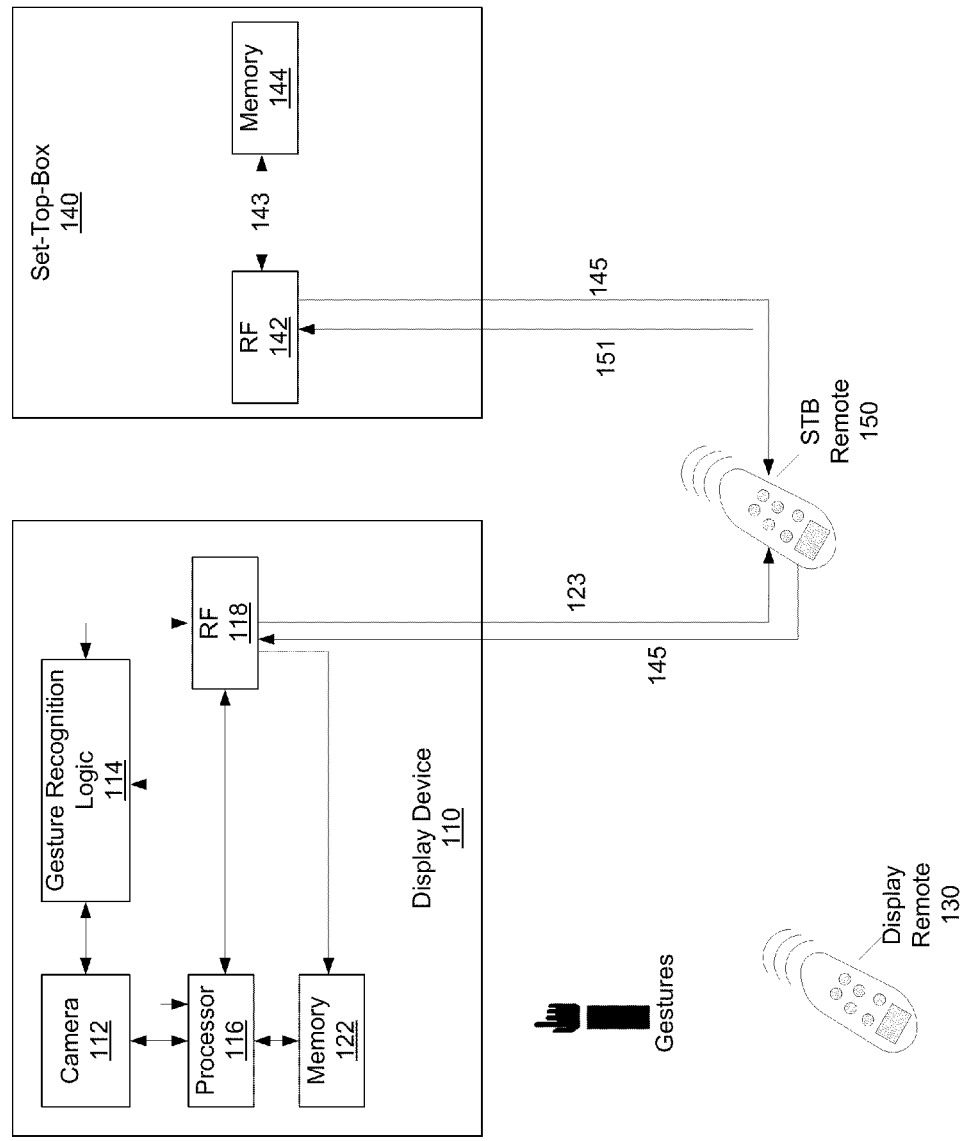
FIG. 2 shows an alternative system for controlling a non-gesture controlled device using gesture interactions with a gesture controlled device in accordance with one embodiment of the present invention.

Referring now to FIG. 2, an alternative system 200 for controlling a non-gesture controlled device 140 using gesture interactions with a gesture controlled device 110 in accordance with one embodiment of the present invention is shown. The system 200 operates substantially similar to that of FIG. 1. In this embodiment, the display device 110 may have a corresponding display remote control 130 and the STB 140 may include a corresponding STB remote control 150.

The processor 116 generates a request message upon invocation of the gesture interaction operation. The request message may be transmitted 123 via the RF 118 component to the STB remote 150. It is appreciated that instead of using the RF 118 component to transmit the request message, an infra red (IR) component may be used to transmit the request message to the STB remote 150.

The STB remote 150 may in turn generate a signal or merely relay 151 the request message to the RF 142 component. It is appreciated that instead of using the RF 142 component to communicate with the display device 110 via the STB remote 150, an IR component may be used. The STB 140 in response to receiving the request message fetches the GUI of the STB 140 and transmits 145 the GUI to the display device 110 via a wireless channel, or a wired channel or via the STB remote 150 control. The display device 110 utilizes the transmitted GUI in a similar fashion as it was described with respect to FIG. 1 in order to generate a command operable to control an operation of the STB 140. Alternatively, the GUI may already be resident in memory 122 in which it is merely involved by the command. The remainder of the operation of this embodiment is similar to FIG. 1, except commands from device 110 are sent first to the remote 150, which then relays them to the device 140 for control thereof. In this example, the non-gesture controlled device 140 is controlled (via remote 150) by commands from the gesture controlled device 110.

It is appreciated that other forms of communication to transmit the command resulting from user interaction with the GUI may be used. For example, the command may be an HDMI CEO command and it may be transmitted via an HDMI cable. Moreover, it is appreciated that a Wi-Fi technology may be used along with access points to facilitate the communication between the display device 110 and the STB 140. In one embodiment, a BPL component may be used to facilitate communication between the display device 110 and the STB 140 via an electronic outlet.

Figure 3C:
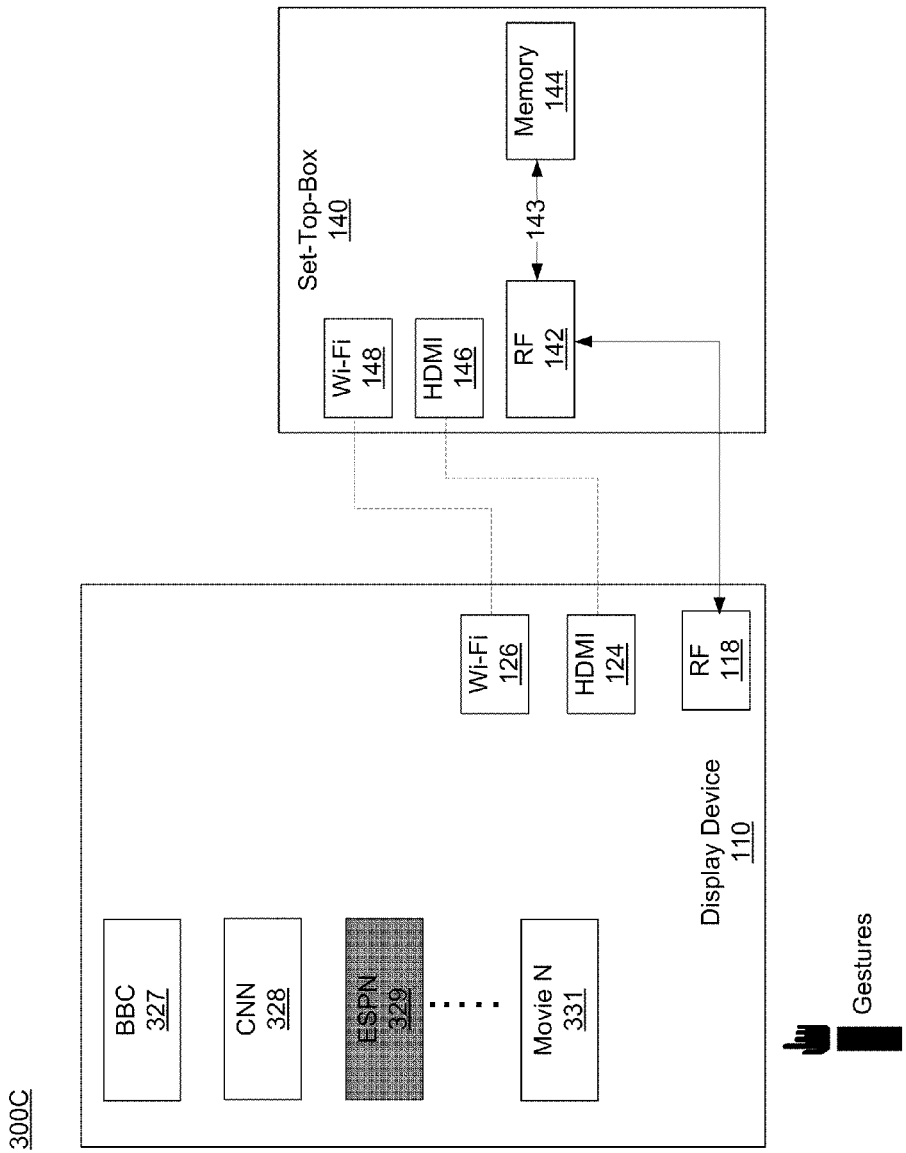

Referring now to FIGS. 3A-3C, exemplary elements of a graphical user interface (GUI) of a non-gesture controlled device rendered by a gesture controlled device for interaction thereof in accordance with one embodiment of the present invention are shown. The display device 110 may render a plurality of graphical elements, e.g., GUI for the display 310, GUI for the STB 320, GUI for the playstation 330, etc. It is appreciated that the GUI for the STB 320 and the GUI for the playstation 330 may represent GUIs that have been fetched or will be fetched from their respective devices, as described with respect to FIGS. 1 and 2.

Referring to FIG. 3A, the specific GUI for the STB 320 is selected using gestures. For example, the gesture recognition logic 114 may process the gestures captured by the camera 112 to determine that the user has selected the GUI for the STB 320. In response to the selection, the GUI of the STB 140 may be accessed, as presented above with respect to FIGS. 1 and 2. For example, the GUI of the STB 140 may be accessed from accessing the memory component 122 or it may be accessed directly from the memory component 144 of the STB 140, as presented above.

Referring now to FIG. 3B, the GUI of the STB 140 is rendered by the display device 110. For example, a plurality of graphical elements associated with the GUI of the STB 140 may be rendered by the display device 110, e.g., menu 321, tools 322, TV Guide 323, DVR 324, On-Demand 325, Settings 326, etc. User gestures are used to interact with the graphical elements rendered by the display device 110. For example, gestures may be captured by the camera 112 and processed by the gesture recognition logic 114 to determine that the user has selected the On-Demand 325 graphical element.

According to one embodiment, the processor 116 may generate a command signal in response to the user selection or execution of an action or script in association with the GUI. The command signal may be executed by the display device 110 and/or by the STB 140. For example, the command signal may cause the GUI of the STB 140 stored in the memory 122 to be updated in response to the user selection. In one exemplary embodiment, the processor 116 in response to the user selection may transmit the command signal to the STB 140 to instruct the STB 140 to perform an operation, e.g., provide options available under the On-Demand 325 selection. In response to the command signal, the STB 140 may respond by providing the available options under the On-Demand 325 selection, for instance.

Referring now to FIG. 3C, the GUI of the STB 140 is updated in response to the user selection of the On-Demand 325 element. For example, additional graphical elements, e.g., BBC 327, CNN 328, ESPN 329, Movies N 331, etc., may be rendered by the display device 110 in response to the selection of the On-Demand 325 element.

The user may interact (via device 110) with the graphical elements associated with the GUI of the STB 140 to make a selection using gestures, as presented above. For example, the ESPN 329 may be selected using gestures. The camera 112 captures the gestures and the gesture recognition logic 114 processes the gestures and communicates the processed gesture to the processor 116. The processor 116 generates a command signal based on the selection. The command signal may be stored, e.g., in the memory component 122. The command signal may be transmitted to the STB 140 using a wireless channel, e.g., the RF 118 component of the display device 110. It is appreciated, however, that a wired transmission line may be used.

According to one embodiment, the STB 140 receives the command signal via its RF 142 component. It is appreciated that a wireless transmission line may be used. Moreover, as presented above, IR signal, Wi-Fi signaling, or signaling via power lines, may be used in conjunction with the STB remote control 150 to facilitate the communication between the display device 110 and the STB 140.

The STB 140 as a result of receiving the command signal, e.g., selection of the ESPN 329 channel, may perform an operation, e.g., tune to the selected channel. Upon performing the operation based on the command signal, the STB 140 may send a response signal, e.g., acknowledgement that an operation is performed, to the display device 110. The STB 140 may further provide the performed operation to the display device 110 for rendering, e.g., displaying the ESPN 329 that has been selected.

It is appreciated that other forms of communication between the display device 110 and the STB 140 may be used. For example, HDMI components 124 and 146 and/or Wi-Fi components 126 and 148 may be used.

Accordingly, a non-gesture controlled device such as the STB 140 can be controlled using gestures detected by another, gesture controlled device. Moreover, using RF signaling, Wi-Fi signaling, BPL signaling, Z-wave signaling, ZigBee signaling or other wireless enables gesture control of the STB 140 even in absence of a clear line of site between the display 110 and the STB 140 or the user.

Figure 4:
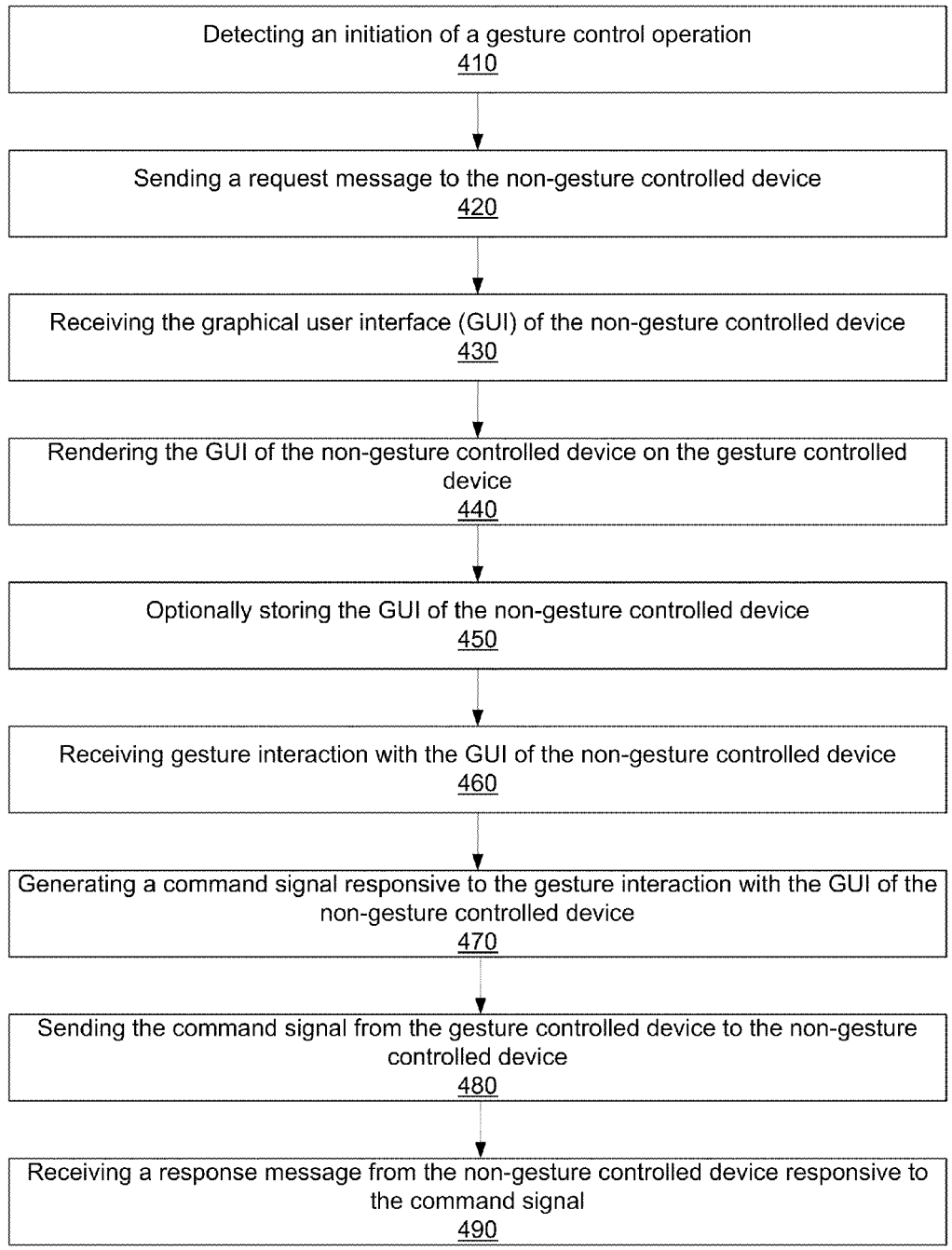
FIG. 4 shows an exemplary computer controlled flow diagram in accordance with one embodiment of the present invention.

Referring now to FIG. 4, an exemplary flow diagram 400 in accordance with one embodiment of the present invention is shown. At step 410, a gesture controlled device, e.g., the display device 110, detects an initiation of a gesture control operation of a user. For example, the camera 112 captures gestures and the gesture recognition logic 114 processes the captured gestures to determine whether the gesture control operation is initiated. At step 420, the gesture controlled device may send a request message to a non-gesture controlled device, e.g., STB 140. The request message may include a request for a GUI of the non-gesture controlled device.

The non-gesture controlled device in response to the request message transmits its GUI to the gesture controlled device. At step 430, the gesture controlled device receives the GUI of the non-gesture controlled device. The GUI may be in any format, e.g., XML/HTML, etc. At step 440, the GUI of the non-gesture controlled device is rendered by the gesture controlled device. Optionally, at step 450, the GUI of the non-gesture controlled device may be stored in the memory component 122 of the gesture controlled device.

At step 460, the gesture controlled device receives and captures gesture interactions by the user with the rendered GUI of the non-gesture controlled device. In response to the gesture interactions with the GUI of the non-gesture controlled device, the gesture controlled device generates command signals, at step 470. The command signal may be an HDMI CEO command or a command to execute a script or to perform an operation. According to one embodiment, the command signals may be stored in the memory component 122. The command signals are subsequently transmitted to the non-gesture controlled device, at step 480.

The non-gesture controlled device receives the command signals and performs an operation based on the command signals. In response to the performed operation, the non-gesture controlled device may transmit a response message to the gesture controlled device. For example, the response message may be an acknowledgement signal and/or the result of the operation performed by the non-gesture controlled device.

At step 490, the gesture controlled device receives the response message from the non-gesture controlled device. The response message and/or the result of the operation by the non-gesture controlled device may be rendered by the gesture controlled device.

Accordingly, a non-gesture controlled device such as the STB 140 can be controlled using gestures without integrating a camera or gesture software within the non-gesture controlled device, thereby reducing device cost and complexity. Moreover, using RF signaling, Wi-Fi signaling, HDMI signaling, Z-wave signaling or ZigBee signaling enable gesture control of the STB 140 even in absence of a clear line of site between the STB 140 and the user or the display. Furthermore, a gesture controlled device such as the display device 110 may be used to control a non-gesture controlled device through gesture interactions with the gesture controlled device.

Figure 5:
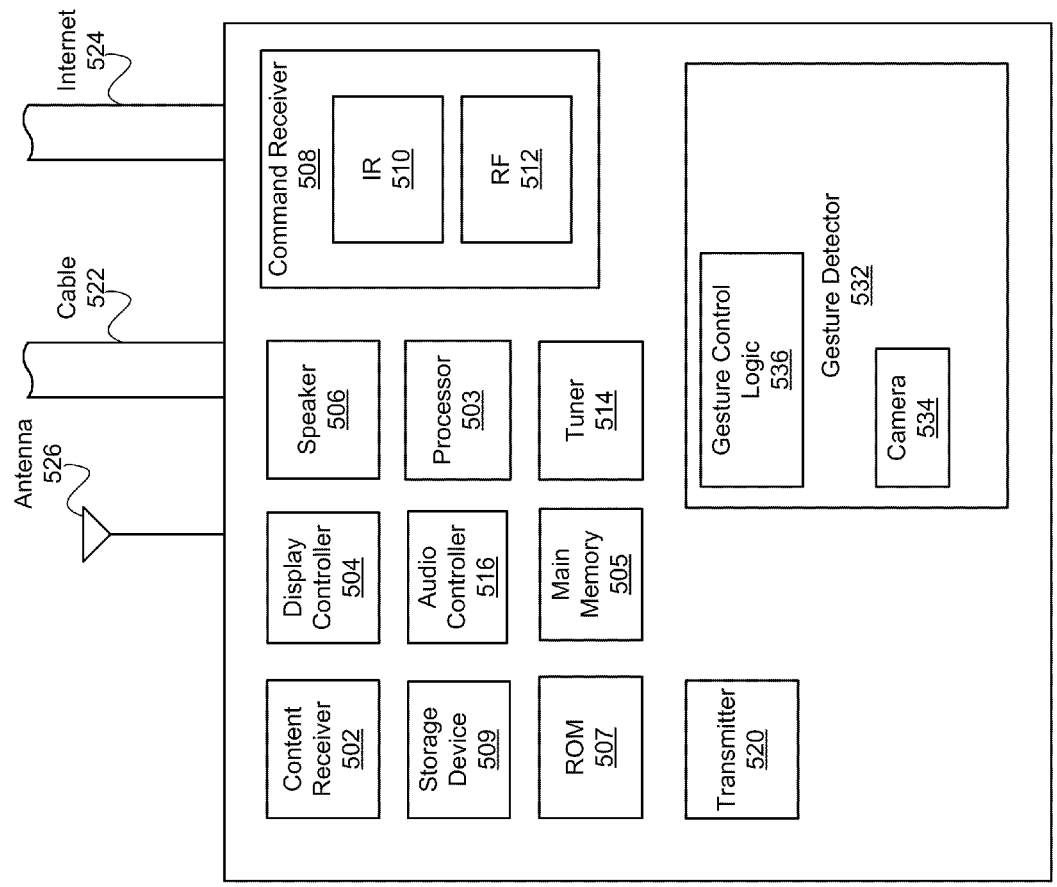
FIG. 5 shows an exemplary television set in accordance with one embodiment of the present invention.

FIG. 5 illustrates components of an exemplary computer controlled television set 500 that may serve as a platform for embodiments of the present invention. Although specific components are disclosed in system 500 it should be appreciated that such components are exemplary. That is, embodiments of the present invention are well suited to having various other components or variations of the components recited in system 500. The exemplary television set 500 implements the process for controlling a non-gesture controlled device using gesture interaction with a gesture control device as shown in FIGS. 1-4. The exemplary television set 500 includes a processor 503 for processing information and a tuner 514 for tuning the television set 500 to detect channels and signals associated therewith. It is appreciated that the tuner 514 may also convert the detected channel signals into a suitable form that is appropriate for processing by the processor 503.

The exemplary television set 500 also includes a main memory 505, such as a random access memory (RAM) or other dynamic storage device for storing information and instructions to be executed by processor 503. Main memory 505 also may be used for storing temporary variables or other intermediate information during execution of instructions to be executed by processor 503. The exemplary television set 500 further includes a read only memory (ROM) 507 or other static storage device for storing static information and instructions for processor 503. A non-volatile storage device 509, such as a magnetic disk or optical disk, may be provided for storing information and instructions and may store the persistent internal queue. According to one embodiment, the instructions for implementing the bezel lighting operations may be stored on any one of the memory components (e.g., RAM, ROM, non-volatile storage device and etc.). The exemplary television set 500 may comprise a display screen 511 for displaying content.

The television set 500 may also include a gesture detector 532 that further includes gesture control logic 536 and a camera 534. It is appreciated that the gesture control logic 536 operates substantially similar to the gesture recognition logic of FIGS. 1 and 2. Moreover, the camera 534 operates substantially similar to the camera of FIGS. 1 and 2.

The term "computer-readable medium" as used herein refers to any medium that participates in providing instructions to processor 503 for execution. Such a medium may take many forms, including but not limited to, non-volatile media, volatile media, and transmission media. Non-volatile media includes, for example, optical or magnetic disks, such as storage device 509. Volatile media includes dynamic memory, such as main memory 505. Transmission media includes coaxial cables, copper wire and fiber optics, including the wires. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or a television set can read.

The exemplary television set 500 may further include content receiver 502, display controller 504, command receiver 508, audio controller 516, transmitter 520, cable or cable connection 522, internet or LAN connection 524, and wireless antenna 526. The exemplary television set 500 may also include a speaker 506 for rendering audio outputs. It is appreciated that the cable connection may be via an HDMI cable, power cable, etc.

Content receiver 502 receives content for system 500. Receiver 502 may receive signals including content from a variety of sources including, but not limited to, computers, computer networks, portable devices, set-top boxes, over the air broadcasts, cable broadcasts, satellite broadcasts, Digital versatile Discs (DVDs), Blue-ray discs, Digital Video Broadcasting—Handheld (DVB-H), Digital Multimedia Broadcasting (DMB), Digital Video Broadcasting Satellite services to Handhelds (DVB-SH), Digital Audio Broadcasting (DAB), Digital Video Broadcasting IP Datacasting (DVB-IPDC), Internet Protocol Television (IPTV), etc. Content receiver 502 may receive content (e.g., electronic programming guide information and other content) via cable or satellite connection 522, internet connection 524, and wireless antenna 526 (e.g., via 802.11a/b/g/n, Bluetooth, Z wave, Digital Broadcast, ZigBee, etc.).

Display controller 504 controls display screen of system 500. Display controller 504 may control a variety of display screens associated with system 500, including but not limited to, CRTs, LCDs, plasma displays, projection based, and Digital Light Processing (DLP) displays.

Command receiver 508 receives commands. Command receiver 508 may receive commands via a variety of receivers including, but not limited to, infrared receivers and radio frequency receivers. The commands may have been issued via a remote control or in response to user gestures. In one embodiment, command receiver 508 includes an infrared (IR) receiver 510 and a radio frequency (RF) receiver 512.

The processor 503 processes commands received by system 500 via command receiver 508. The commands received are processed and executed by system 500. For example, control codes (e.g., increase volume, change channel, launch an application, launch web browser, etc.) may be received via an infrared receiver 510 or radio frequency receiver 512, decoded, and sent to the processor 503. Moreover, gesture commands may be received and a command signal may be generated by the processor 503 that is subsequently transmitted to a non-gesture controlled device.

Audio controller 516 controls audio output for system 500 including a variety of outputs including, but not limited to, 2, 2.1, 3.1, 5.1, 6.1, 7.1, and 8.1 channel audio. The audio content may be received via content receiver 502. It is appreciated that audio controller 516 may output to audio equipment integrated within system 500.

Transmitter 520 may send signals to a control device (e.g., remote control) or to other electronic devices, e.g., a set-top-box that is non-gesture controlled. The signals may include, but are not limited to, acknowledgments, EPGs (e.g., for download to a remote control) encrypted information, and information based on on-screen selections.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A television set comprising:
a display for rendering images;
a gesture detector operable to detect a user performed gesture control operations;
a transceiver operable to communicate with an electronic device separate from said television set; and
a processor operable to render a graphical user interface (GUI) specific to said electronic device on said display and operable to allow gesture controlled interaction of said GUI responsive to said gesture detector, and wherein said processor is further operable to generate a command message responsive to gesture interactions with said GUI, wherein said command message is operable to be communicated by said transceiver to said electronic device to control an operation of said electronic device, wherein said processor is further operable to, responsive to a determination by the processor based on signals from the gesture detector that a person has input a predetermined gesture, cause said transceiver to send a request message to said electronic device, wherein said request message is a request to receive a graphical user interface (GUI) of said electronic device.

2. The television set as described in claim 1 further comprising: a memory component operable to store said GUI of said electronic device.

3. The television set as described in claim 1, wherein said transceiver receives said GUI of said electronic device responsive to said request message.

4. The television set as described in claim 1, wherein said processor is operable to cause said transceiver to send said command message to said electronic device.

5. The television set as described in claim 4, wherein said transceiver is operable to receive a response message from said electronic device responsive to said command message.

6. The television set as described in claim 1, wherein said transceiver comprises a wireless radio frequency component.

7. The television set as described in claim 1, wherein said gesture detector comprises: a camera for accepting said gesture interactions; and gesture recognition logic operable to process said gesture interactions.

8. A method of controlling a non-gesture controlled device via gesture interaction with a gesture controlled device, said method comprising:
said gesture controlled device detecting user performed gestures;
the gesture controlled device receiving a first gesture and determining whether the first gesture matches a first predetermined gesture indicating a desire to control a specific device;
the gesture controlled device, responsive to a determination that the first gesture matches the first predetermined gesture and that the specific device indicated by the first gesture is the non gesture control device, sending a request to the non gesture control device for a graphical user interface (GUI);
said gesture controlled device rendering graphical user interface (GUI) of the non-gesture controlled device for gesture interactions thereof responsive to said user performed gestures; and
said gesture controlled device generating a command signal responsive to gesture interactions with said GUI, wherein said command signal is operable to be communicated to said non-gesture controlled device to control an operation of said non-gesture controlled device.

9. The method as described in claim 8 further comprising: said gesture controlled device sending said command signal to said non-gesture controlled device.

10. The method as described in claim 8 further comprising: said gesture controlled device storing said GUI of said non-gesture controlled device.

11. The method as described in claim 8 further comprising: said gesture controlled device receiving a response message from said non-gesture controlled device responsive to said command signal.

12. The method as described in claim 8, wherein said gesture controlled device is a television set.

13. The method as described in claim 8, wherein said non-gesture controlled device is a set-top-box.

14. An electronic device comprising:
a gesture recognition system comprising a camera and a gesture recognition logic unit, said gesture recognition system operable to detect recognized gestures based on user performed gesture actions;
a display;
a memory device;
a processor operable to receive said recognized gestures from said gesture recognition system, said processor operable to recognize a gesture indicating a desired to control using gestures an external device and responsive to recognizing the gesture indicating a desire to control the external device, sending a request to the external device to provide a graphical user interface (GUI), the processor being further operable to display the graphical user interface pertinent from the external device and operable to allow gesture-controlled interactions with said graphical user interface based on said recognized gestures; and
a transmitter, responsive to said processor, for transmitting a command for controlling said external device based on said gesture-controlled interactions.

15. An electronic device as described in claim 14 wherein said external device is an audio/video source device and wherein said transmitter is a wireless transmitter.

16. An electronic device as described in claim 15 wherein said audio/video source is a set-top-box and wherein said wireless transmitter is a radio frequency transmitter.

17. An electronic device as described in claim 15 further comprising a receiver operable for receiving said graphical user interface from said external device responsive to a first recognized gesture.

18. An electronic device as described in claim 17 wherein said receiver is further operable to receive a response indicating from said external device indicating that said external device received said command.

* * * * *